(12) United States Patent
Polk et al.

(10) Patent No.: US 7,786,894 B2
(45) Date of Patent: Aug. 31, 2010

(54) METHODS, APPARATUS, AND SYSTEMS FOR MONITORING TRANSMISSION SYSTEMS

(75) Inventors: Robert E. Polk, Idaho Falls, ID (US); John M. Svoboda, Idaho Falls, ID (US); Phillip B. West, Idaho Falls, ID (US); Gail L. Heath, Iona, ID (US); Clark L. Scott, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 240 days.

(21) Appl. No.: 11/425,287

(22) Filed: Jun. 20, 2006

(65) Prior Publication Data

US 2008/0024321 A1 Jan. 31, 2008

(51) Int. Cl.
G08C 19/22 (2006.01)
H04Q 9/00 (2006.01)
(52) U.S. Cl. .................. 340/870.07; 340/870.11; 324/771; 374/141; 374/152; 702/183; 702/185
(58) Field of Classification Search ............ 340/870.07, 340/870.11; 702/183, 185
See application file for complete search history.

(56) References Cited

U.S. PATENT DOCUMENTS

| | | | | |
|---|---|---|---|---|
| 4,420,752 A * | 12/1983 | Davis et al. | ............ | 340/870.17 |
| 4,589,081 A * | 5/1986 | Massa et al. | ................ | 702/185 |
| 4,829,298 A * | 5/1989 | Fernandes | ............... | 340/870.27 |
| 4,961,644 A * | 10/1990 | Marsden | ..................... | 356/73.1 |
| 5,132,968 A * | 7/1992 | Cephus | ....................... | 370/349 |
| 5,818,821 A * | 10/1998 | Schurig | ...................... | 370/293 |
| 6,167,525 A * | 12/2000 | Donazzi et al. | ............ | 361/93.8 |
| 6,205,867 B1 * | 3/2001 | Hayes et al. | ........... | 73/862.391 |
| 6,333,975 B1 * | 12/2001 | Brunn et al. | ........... | 379/106.03 |
| 6,845,333 B2 * | 1/2005 | Anderson et al. | ............. | 702/65 |
| 6,965,320 B1 | 11/2005 | Casey et al. | | |
| 7,053,770 B2 * | 5/2006 | Ratiu et al. | ............. | 340/539.1 |
| 7,282,944 B2 * | 10/2007 | Gunn et al. | ................. | 324/771 |
| 7,292,797 B2 * | 11/2007 | Kunugi et al. | ................. | 399/49 |
| 7,304,976 B2 * | 12/2007 | Mao et al. | .................... | 370/338 |
| 2004/0054921 A1 | 3/2004 | Land, III | | |
| 2005/0231387 A1 * | 10/2005 | Markelz | ..................... | 340/937 |
| 2006/0077918 A1 * | 4/2006 | Mao et al. | .................... | 370/310 |

\* cited by examiner

*Primary Examiner*—Timothy Edwards, Jr.
(74) *Attorney, Agent, or Firm*—TraskBritt

(57) ABSTRACT

A sensing platform for monitoring a transmission system, and method therefor, may include a sensor that senses one or more conditions relating to a condition of the transmission system and/or the condition of an environment around the transmission system. A control system operatively associated with the sensor produces output data based on an output signal produced by the sensor. A transmitter operatively associated with the control system transmits the output data from the control system.

17 Claims, 5 Drawing Sheets

METHODS, APPARATUS, AND SYSTEMS FOR MONITORING TRANSMISSION SYSTEMS

CONTRACTUAL ORIGIN OF THE INVENTION

This invention was made with government support under Contract Number DE-AC07-05ID14517 awarded by the United States Department of Energy. The government has certain rights in the invention.

CROSS-REFERENCE TO RELATED APPLICATION

This application is related to copending U.S. patent application Ser. No. 12/572,141, filed Oct. 1, 2009, which is a divisional of this application.

TECHNICAL FIELD

This invention relates to sensing systems in general and more specifically to methods, apparatus, and systems for monitoring transmission systems.

BACKGROUND

Transmission systems, such as pipelines, cell towers and electrical power transmission systems, can be damaged in a variety of ways, including damage by weather, by accidents, and by intentional sabotage, just to name a few. Of course, many elements of such transmission systems are often located in remote areas where monitoring of the systems may be quite difficult, dangerous, and expensive. However, damage to these transmission systems can result in even more costly and extensive repairs. For example, damage to multiple towers of an electrical power transmission system could cause cascading or "rolling" blackouts.

Early notification of damage to a transmission system can provide several benefits. If a transmission system operator is informed that an event is forthcoming then the operator can follow a procedure for mitigating the consequences of that event. For electrical power transmission systems, for example, an operator could take steps to localize the problem, thus minimizing or preventing the occurrence of cascading blackouts. Additionally, if an operator is informed that an event, such as intentional sabotage, is happening at a given location, the operator can alert local law enforcement authorities so that the intruder may be captured. Monitoring of transmission systems may also provide an opportunity for enhancing security or monitoring of remote locations, such as border areas.

SUMMARY OF THE INVENTION

One embodiment of a sensing platform for monitoring a transmission system may comprise a sensor that senses one or more conditions relating to a condition of the transmission system and/or the condition of an environment around the transmission system. A control system operatively associated with the sensor produces output data based on an output signal produced by the sensor. A transmitter operatively associated with the control system transmits the output data from the control system.

A system for monitoring a transmission system may comprise a plurality of sensing platforms operatively associated with the transmission system at a corresponding plurality of locations along the transmission system. Each sensing platform may include a sensor that senses one or more conditions of the transmission system, a control system that produces output data based on output signals from the sensor, and a transceiver that transmits the output data from the control system. At least one endpoint receiver receives the output data transmitted by a sensing platform.

A method for monitoring a transmission system may involve the steps of: Sensing one or more conditions of the transmission system and/or an environment around the transmission system, and transmitting data related to the sensed condition.

BRIEF DESCRIPTION OF THE DRAWINGS

Illustrative and presently preferred embodiments of the invention are shown in the accompanying drawings in which.

DETAILED DESCRIPTION OF THE PREFERRED EMBODIMENTS

Figure 1:
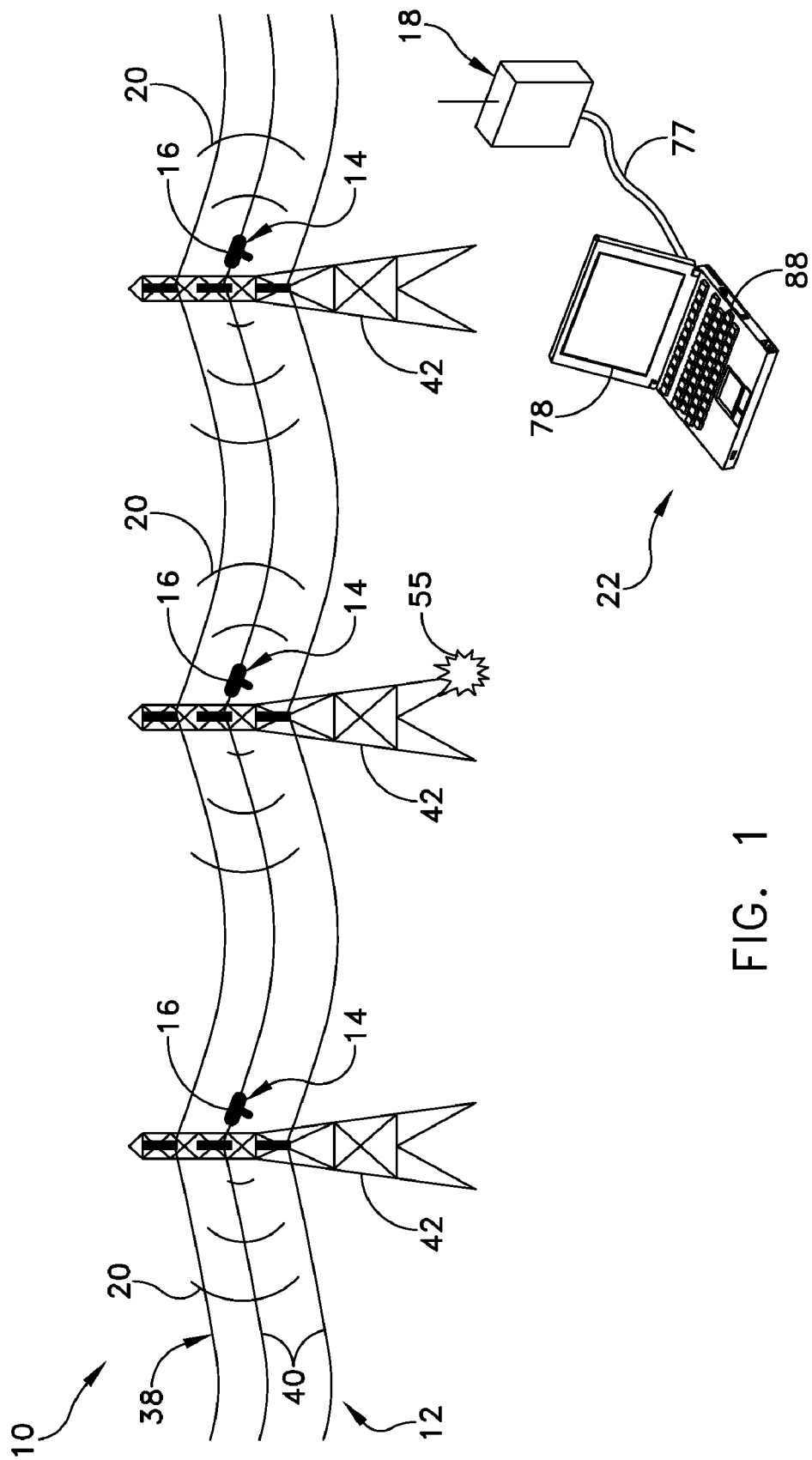
FIG. 1 is a pictorial representation of a system for monitoring a transmission system according to one embodiment of the invention.

One embodiment of a monitoring system 10 is shown in FIG. 1 as it may be used to monitor a portion, or even substantially the entirety, of a transmission system 12. By way of example, in one embodiment, the transmission system 12 may comprise an electrical power transmission system 38, although the invention may be used with other types of transmission systems as well. Briefly, the monitoring system 10 may comprise a plurality of individual sensing platforms 14 provided at various locations 16 along the transmission system 12. Monitoring system 10 may also comprise at least one endpoint receiver 18. Endpoint receiver 18 may be positioned so that it receives information 20 transmitted by at least one of the plurality of sensing platforms 14. In the embodiment shown and described herein, endpoint receiver 18 may be operatively associated with a user interface system 22, such as, for example, a personal computer, to allow a user (not shown) to interpret and/or act on the information 20 received by endpoint receiver 18. In addition, and as will be described in greater detail below, user interface system 22 may also allow the user to transmit information or programming instructions to the various sensing platforms 14.

Figure 2:
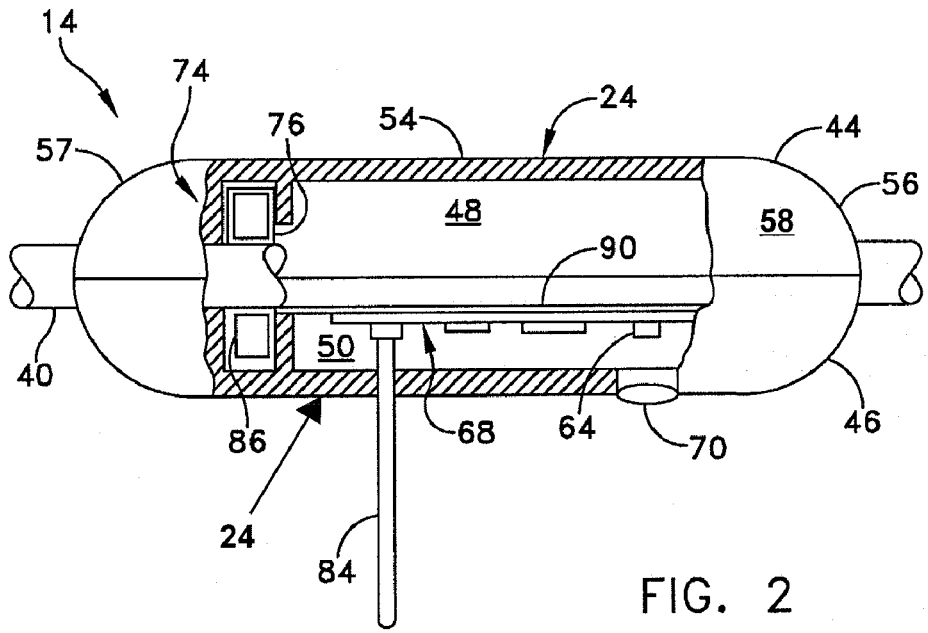
FIG. 2 is a side view in elevation of one embodiment of a sensing platform with a portion of the housing broken away to reveal the internal subsystems and components.
Figure 4:
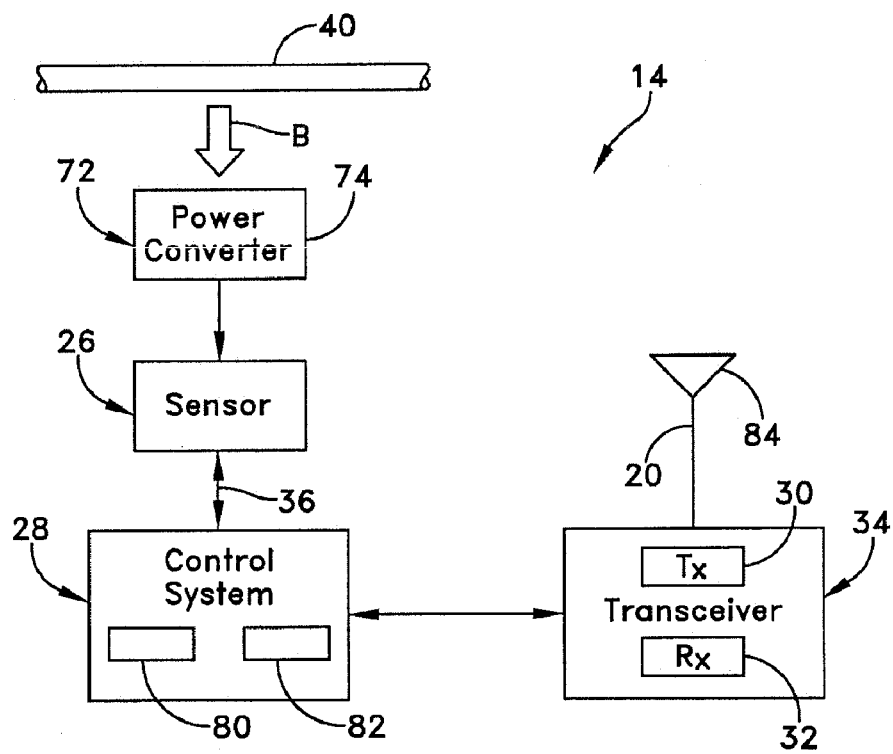
FIG. 4 is a schematic block diagram of the sensing platform illustrated in FIGS. 2 and 3.
Figure 3:
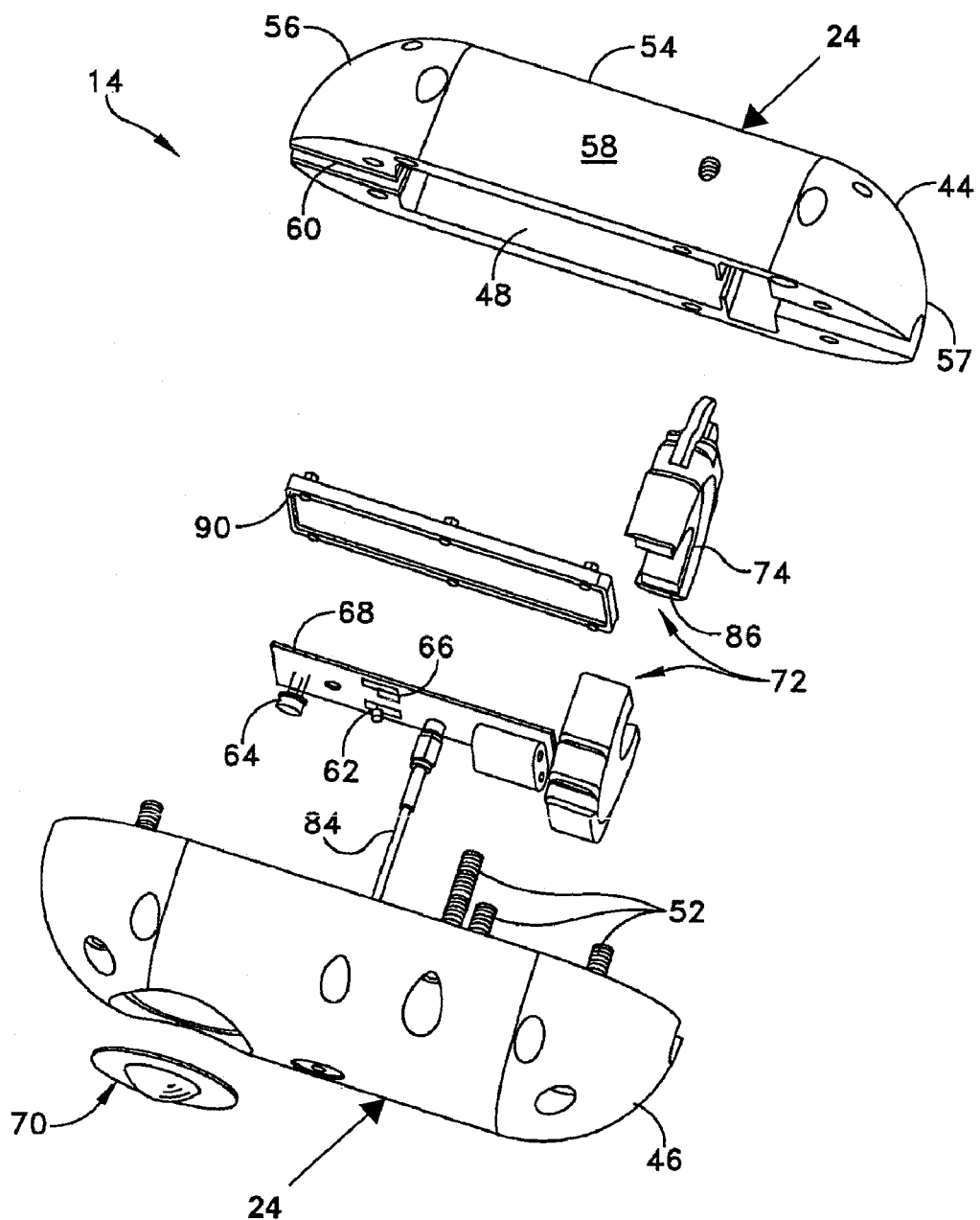
FIG. 3 is an exploded perspective view of the sensing platform illustrated in FIG. 2.

Referring now primarily to FIGS. 2-4, each sensing platform 14 may be identical to the others (although this need not be the case), and may comprise a chassis or housing 24 sized to receive the various components and subsystems comprising the individual sensing platform 14. For example, in one embodiment, the sensing platform 14 may comprise at least one sensor 26, a control system or processor 28, and a transmitter 30. The sensing platform 14 also may be provided with a receiver 32, in which case the combination of the transmitter 30 and receiver 32 may be referred to herein in the alternative as a transceiver 34.

The one or more sensors 26 comprising the sensing platform 14 may be used to sense one or more conditions of the transmission system 12 and/or one or more conditions of an environment around the transmission system 12. In one embodiment, the control system or processor 28 is operatively associated with the sensor(s) 26 and is also responsive to output signal(s) 36 produced by the sensor(s) 26 that relates to the sensed condition(s). The control system 28 produces information 20 that relates to or is derived from the sensed condition. The transmitter 30 is then used to transmit the information 20 produced by the control system 28.

The sensing platform 14 may also be provided with a power conversion system 72. Power conversion system 72 extracts energy from the transmission system 12 (FIG. 1) and converts it into a form useable by the sensing platform 14. For example, in an embodiment wherein the transmission system 12 comprises an electrical power transmission system 38 (see FIG. 1), the power conversion system 72 may comprise an inductive power converter 74. Briefly, inductive power converter 74 may comprise a wire coil 76 positioned so that it is within an alternating magnetic field (shown schematically at "B" in FIG. 4) surrounding an electrical conductor 40 of the electrical power transmission system 38. The alternating magnetic field B induces an alternating electric current in wire coil 76 which may then be rectified and/or regulated by the inductive power converter 74 so that it is useable by the sensing platform 14.

In a typical operational example, each sensing platform 14 monitors at least one condition of the transmission system 12, such as, for example, vibrations detected in the transmission system 12 due to an event 55 occurring on or nearby support tower 42. See FIG. 1. Alternatively, each sensing platform 14 may monitor at least one condition of an environment around the transmission system 12, such as, for example, an ambient temperature or light in the infrared wavelength range that may be emitted by various objects or persons in the environment around the transmission system 12. The control system 28 of each sensing platform 14 may be configured to evaluate or analyze the output signals 36 produced by the sensor or sensors 26 to produce information 20. For example, in one embodiment, the control system 28 analyzes the output signal(s) 36 from the sensor(s) 26 to determine whether the sensed condition is a normal condition or an anomalous condition. If the sensed condition is determined to be an anomalous condition, the control system 28 may operate the transmitter 30 of the sensing platform 14 to transmit information 20. The transmitted information 20 is ultimately received by the endpoint receiver 18 (FIG. 1). If the sensed condition is determined to be a normal condition, then no information need be sent, although it could be.

In this regard it should be noted that, in a typical embodiment, the endpoint receiver 18 will be located at a position beyond the transmitting range of most of the individual sensing platforms 14. Therefore, in order to ensure that the transmitted signal from any one of the individual sensing platforms 14 will be received by the endpoint receiver 18, each sensing platform 14 may be provided with a transceiver 34 (e.g., a transmitter 30 and a receiver 32). Consequently, in an embodiment wherein the monitoring system 10 comprises a plurality of sensing platforms 14 having such transceivers 34, signals transmitted by one sensing platform 14 may be received by one or more nearby sensing platforms 14. The nearby sensing platform(s) 14 may then re-transmit the signal, see FIG. 1. In this manner, the transmitted signal may be relayed by various ones of the sensing platforms 14 comprising the monitoring system 10 until the signal is ultimately received by the endpoint receiver 18.

Additional redundancy may be realized by providing the monitoring system 10 with two or more endpoint receivers 18 located at different positions along the transmission system 12 (not depicted). If, for some reason, the signal from a sensing platform 14 fails to be relayed by nearby sensing platforms 14 along one direction, (thus fails to reach a first endpoint receiver 18), the signal from sensing platform 14 relayed by nearby sensing platforms 14 in the other direction may be received by a second endpoint receiver 18 located at the different position. Of course, the provision of additional endpoint receivers 18 at various points along the transmission system 12 may provide additional measures of redundancy.

Once the information 20 is received by the endpoint receiver 18 it may be presented in human-readable form, thereby allowing a user or system operator to interpret and/or act upon the information 20, as the case may be. In the embodiment shown and described herein, the endpoint receiver 18 is operatively associated with a user interface system 22 for this purpose. The user interface system 22 may present the received information 20 on a display system 78. For example, if the information 20 relates to an anomalous condition (e.g., event 55, FIG. 1) detected by one or more of the sensing platforms 14, the user interface system 22 may provide an indication about the anomalous condition, what it may relate to (e.g., vibrations, temperature, or infrared signature), as well as the particular sensing platform(s) 14 that detected the anomalous condition. Additional information, data, and options may also be provided by user interface system 22, as will be described in further detail herein.

One advantage of the present invention is that it may be used to monitor a transmission system 12 and to provide to an endpoint receiver 18 information 20 regarding one or more monitored conditions. In one exemplary embodiment, the information 20 regarding the one or more monitored conditions may be evaluated by a user to make a determination about whether the integrity of the transmission system 12 is, or may soon be, compromised. Alternatively, in another exemplary embodiment, a user may utilize the information 20 about the monitored condition or conditions for purposes other than evaluating the integrity and security of the transmission system 12. For example, the information 20 provided by one or more of the sensing platforms 14 may be utilized to derive information about the passage of persons or vehicles within sensing range of one or more of the individual sensing platforms 14. Still other purposes and variations are possible, as would become apparent to persons having ordinary skill in the art after having become familiar with the teachings provided herein. Consequently, the methods, apparatus, and systems shown and described herein should not be regarded as limited to any particular purpose.

Still other advantages are associated with the power conversion system 72 which may be provided in each of the sensing platforms 14. For example, deriving from the transmission system 12 the energy required to operate the individual sensing platforms 14 dispenses with the need to provide each individual sensing platform 14 with a separate power supply (e.g., a storage battery) capable of operating the sensing platform 14. Accordingly, the power conversion system 72 will allow the individual sensing platforms 14 to be readily located at even remote areas along the transmission system 12 without concern for providing a separate power source (e.g., a storage battery) to the sensing platforms 14. Of course, the arrangement also dispenses with the need to periodically service or replace the storage battery.

Still other advantages are associated with the monitoring system 10. For example, and as shown and described herein, a plurality of individual sensing platforms 14 may be mounted at various locations 16 (see FIG. 1) along the transmission system 12, thereby allowing extended portions, or even substantially the entirety, of the transmission system 12 to be monitored. Alternatively, only selected portions of the transmission system 12 may be monitored with the monitoring system 10. In addition, the ability of the sensing platforms 14 to relay transmissions from adjacent sensing platforms 14 allows low-power transmitters (e.g., transceivers) to be utilized. The signal relaying capability also dispenses with the need to provide more than one endpoint receiver 18, although multiple endpoint receivers 18 may be provided if so desired. In addition, the signals transmitted by the individual sensing platforms 14 are typically of sufficient strength so that they may be received by more than one adjacent sensing platform 14. Consequently, the signal may continue to be relayed even though one of the sensing platforms 14 receiving the transmitted signal may be unable to re-transmit (e.g., relay) the signal.

Moreover, it should also be noted that the various individual sensing platforms 14 and monitoring system 10 are not limited to use with electrical power transmission systems 38, but could also be used with other types of transmission systems, such as, for example, telecommunications (e.g., telephone) systems, oil pipelines, gas pipelines, water pipelines, or other types of systems for moving or transmitting resources, such as electricity or materials, from one location to another.

Having briefly described one embodiment of the methods, apparatus, and systems for monitoring transmission systems, as well as some of their more significant features and advantages, various exemplary embodiments of the invention will now be described in detail.

Referring back now to FIG. 1, an exemplary embodiment of a monitoring system 10 is shown and described herein as it may be used to monitor a transmission system 12. The transmission system 12 may comprise an electrical power transmission system 38 having a plurality of electrical conductors 40 supported by a plurality of support towers 42. Alternatively, the monitoring system 10 may be used with other types of transmission systems, such as, for example, telecommunications (e.g., telephone) systems, oil pipelines, gas pipelines, water pipelines, or other types of systems for moving or transmitting resources, such as electricity or materials, from one location to another. Consequently, the present invention should not be regarded as limited to use with any particular type of transmission system 12.

The monitoring system 10 may comprise at least one, and typically a plurality of sensing platforms 14 provided at various locations 16 along the transmission system 12. For example, in the embodiment shown and described herein wherein the transmission system 12 comprises an electrical power transmission system 38, the various sensing platforms 14 are mounted to one of the electrical conductors 40 at locations 16 nearby the support towers 42. So positioning the various sensing platforms 14 nearby the support towers 42 will allow the sensing platforms 14 to more easily monitor conditions (e.g., event 55) on and around the support towers 42. Of course, other positioning arrangements may be utilized depending on the particular type of transmission system 12 and the conditions to be monitored.

Before proceeding with the description, it should be noted that the various ones of the sensing platforms 14 comprising the monitoring system 10 may be identical to one another, although this need not be the case. For example, in an alternative embodiment, various ones of the sensing platforms 14 comprising the monitoring system 10 may be provided with different sensing capabilities depending on where they are to be located on the transmission system 12 and depending on the particular condition(s) that is/are desired to be sensed. In addition, various ones of the sensing platforms 14 may include or lack certain other components (e.g., a transmitter 30 or receiver 32), again depending on the particular application, as well as the desired sensing and monitoring capabilities of the monitoring system 10. Consequently, the present invention should not be regarded as limited to arrangements wherein the sensing platforms 14 are identical to one another.

Referring now primarily to FIGS. 2-4, one embodiment of a sensing platform 14 may comprise a housing 24 sized to receive the various components and subsystems of the sensing platform 14. In one embodiment, housing 24 may comprise a two-piece or split housing 24 having a first half 44 and a second half 46. The first and second halves 44 and 46 of split housing 24 may define one or more respective cavities (e.g., cavities 48 and 50) therein sized to receive the various subsystems and components of the sensing platform 14. The first and second halves 44 and 46 may be releasably secured to one another (e.g., via a plurality of fasteners 52) to allow the first and second halves 44 and 46 to be readily separated, thereby providing easy access to the various systems and components housed therein. The two-piece arrangement of housing 24 also allows the sensing platform 14 to be readily secured to the electrical conductor 40 of the electrical power transmission system 38.

In addition to housing the various components and subsystems of the sensing platform 14, the housing 24 may also need to be provided with certain other features and attributes to allow it to function well in the intended application (e.g., with the particular type of transmission system 12 involved) and in the expected environment. For example, in an embodiment wherein the sensing platform 14 is to be mounted to an electrical conductor 40 of an electric power transmission system 38, the housing 24 should be configured to minimize the likelihood of corona discharge at the voltages expected in the electrical power transmission system 38. Protection against corona discharge is particularly important wherein the voltages involved are in the tens of kilovolt range or higher. One shape that will minimize corona discharge comprises a generally cylindrically-shaped main body portion 54 having a pair of generally hemispherically-shaped end portions 56, 57, as best seen in FIGS. 2 and 3. Alternatively, other shapes are possible, as would become apparent to persons having ordinary skill in the art after having become familiar with the teachings provided herein. In order to further reduce the likelihood of corona discharge, any fasteners 52 used to fasten together the two halves 44 and 46 of housing 24 should be recessed within the halves 44 and 46 so that the fasteners 52 do not protrude beyond the exterior surface 58 of housing 24, as best seen in FIG. 2.

In such an application, housing 24 should also be made from an electrically conductive material (e.g., aluminum) so that housing 24 will remain at the same electrical potential as the electrical conductor 40. However, suitable precautions also should be taken to prevent the housing 24 from carrying electrical current that would normally be carried by electrical conductor 40. One suitable precaution is to provide an insulator 60 (FIG. 3) between one of the end portions (e.g., end portion 56) of housing 24 and the electrical conductor 40, while allowing the other end portion (e.g., end portion 57) of housing 24 to remain in electrical contact with electrical conductor 40. Such an arrangement will allow the housing 24 to acquire the electrical potential on electrical conductor 40 while preventing current from flowing through the housing 24 that may otherwise occur due to the "skin effect" associated with electric current flow. Alternatively, other arrangements are possible for achieving these two conditions, as would become apparent to persons having ordinary skill in the art after having become familiar with the teachings provided herein.

As mentioned above, the sensing platform 14 may be provided with a variety of subsystems and components in order to carry out the functional and operational aspects of the sensing platform 14. In one embodiment, the various subsystems and components are provided on a single printed wiring board 68 sized to be received within housing 24. Printed wiring board 68 may be housed within the second or lower half 46 of housing 24. A cover plate 90 may be used to secure the printed wiring board 68 within the second half 46 and to insulate it from electrical conductor 40, as best seen in FIGS. 2 and 3. Alternatively, other arrangements are possible, as would become apparent to persons having ordinary skill in the art after having become familiar with the teachings provided herein.

Sensing platform 14 may be provided one or more sensors 26 suitable for sensing any of a wide range of conditions of the transmission system 12 (FIG. 1). In this regard it should be noted that, depending on the particular type of sensor, sensor 26 may be used to sense at least one condition of the transmission system 12 or may be used to sense at least one condition of an environment surrounding the transmission system 12. Exemplary sensors that may be utilized in sensing platform 14 include, but are not limited to, motion sensors (e.g., accelerometers), acoustic sensors, temperature sensors, and optical sensors (e.g., detectors and cameras). However, because the particular type of sensor or sensors 26 that may be utilized may depend on the particular application and conditions to be sensed, the present invention should not be regarded as limited to any particular type of sensor or combinations of sensors. By way of example, in one embodiment, each sensing platform 14 is provided with three sensors 26: A two-axis accelerometer 62, an infrared detector 64, and a temperature sensor 66, see FIG. 3. As mentioned above, the various sensors 26 may be mounted to printed wiring board 68.

Two-axis accelerometer 62 detects or senses movement (e.g., acceleration) along two different axes, which may be perpendicular to one another, although this is not required. In addition, the two-axis accelerometer 62 should not be regarded as limited to detecting accelerations along two axes, but could instead comprise a single-axis accelerometer, a three-axis accelerometer, or any combination of single- or multi-axis accelerometers, as may be required to sense or detect the desired motion.

In the embodiment shown and described herein, two-axis accelerometer 62 may be used to detect motion (e.g., vibrations) of the transmission system 12, such as, for example, vibrations caused by event 55 occurring on or near support tower 42, see FIG. 1. Two-axis accelerometer 62 may comprise any of a wide range of accelerometers now known in the art or that may be developed in the future that are, or would be, suitable for the intended application. Consequently, the present invention should not be regarded as limited to any particular type of accelerometer. However, by way of example, in one embodiment, the two-axis accelerometer 62 comprises an "accelerometer on a chip," such as, for example product No. ADXL203, available from Analog Devices, Inc., of Norwood, Mass. The two-axis accelerometer 62 may be mounted to the printed wiring board 68.

The infrared detector 64 may be used to detect light in the infrared portion of the electromagnetic spectrum. Consequently, the infrared detector 64 may be used to detect objects (e.g., persons, animals, or vehicles) or events that emit infrared signatures. In one embodiment, infrared detector 64 comprises a multi-element sensor having a field of view sufficient to encompass the desired area to be sensed. For example, in an embodiment wherein the monitoring system is utilized to monitor an electrical power transmission system 38, it will generally be desirable to provide an infrared detector 64 having a field of view that is sufficiently large so that the infrared detector 64 may be used to monitor a region that includes at least one support tower 42. Consequently, the infrared detector 64 may be used to detect the presence of objects that may pose a threat to the integrity of the support tower 42.

Infrared detector 64 may comprise any of a wide variety of infrared detectors that are known in the art or that may be developed in the future. Consequently, the present invention should not be regarded as limited to use with any particular type of infrared detector 64. However, by way of example, in one embodiment, infrared detector 64 may comprise an infrared detector available from PerkinElmer Optoelectronics, Inc., of Fremont, Calif. as product no. LHi1128. As mentioned above, infrared detector 64 may be mounted on printed wiring board 68. A suitable lens 70 may be mounted to housing 24, as best seen in FIGS. 2 and 3. Alternatively, other arrangements are possible, as would become apparent to persons having ordinary skill in the art after having become familiar with the teachings provided herein.

Sensing platform 14 may also be provided with a temperature sensor 66 for monitoring an ambient temperature, which may be desirable in certain applications. In one embodiment, temperature sensor 66 may comprise a temperature sensor available from Microchip Technology Inc., of Chandler, Ariz. as product No. TC1047. Temperature sensor 66 may be mounted on printed wiring board 68, although other arrangements are possible.

The sensing platform 14 may also comprise a control system or processor 28 operatively associated with the sensor or sensors 26. Control system 28 receives output signals 36 from each of the sensors 26 and produces information 20 relating to the one or more conditions sensed by the sensors 26. Control system or processor 28 may also be mounted to printed wiring board 68 and may comprise one or more general-purpose digital signal processors or "computers on a chip" of the type well known in the art and readily commercially available. By way of example, in one embodiment, the control system 28 comprises two digital signal processors 80 and 82 that operate together to perform the functions and operations of control system 28. The first digital signal processor 80 operates the various sensors 26, receives the various output signals 36 produced by the sensors 26, and analyzes the output signals 36 to produce information 20 about the sensed conditions. The second digital signal processor 82 receives the information 20 from the first digital signal processor 80 and operates the transceiver 34.

The digital signal processors 80 and 82 may comprise any of a wide range of processors now known in the art or that may be developed in the future that are, or would be, suitable for the particular application. Consequently, the present invention should not be regarded as limited to any particular type of processor, or even combinations of processors. However, by way of example, in one embodiment, both digital signal processors 80 and 82 may comprise processors, available from Microchip Technology Inc., of Chandler, Ariz., as product No. PIC30F6012.

As mentioned above, it is generally desired, but not required, to provide each sensing platform 14 with a transceiver 34 comprising a transmitter 30 and a receiver 32. Alternatively, a receiver 32 need not be provided, depending on the functionality that is to be provided by sensing platform 14. The transceiver 34 may be connected to a suitable antenna 84 to allow signals (e.g., information 20) to be transmitted by and received from the transceiver 34 as radio-frequency signals, see FIG. 1. Transceiver 34 may comprise any of a wide range of transceivers known in the art and that would be suitable for the intended application. Consequently, transceiver 34 should not be regarded as limited to any particular type of transceiver. However, by way of example, in one embodiment, transceiver 34 comprises product No. MICRF505 transceiver available from Micrel, Inc., of San Jose, Calif.

Before proceeding with the description, it should be noted that any of a wide variety of alternative configurations and devices may be utilized to transmit the information 20. For example, the information 20 could be transmitted along one or more components (e.g., electrical conductors 40) of the transmission system 12 itself. Alternatively, the information 20 need not be transmitted by radio, but could instead be transmitted by other means (e.g., by light), as would become apparent to persons having ordinary skill in the art after having become familiar with the teachings provided herein. Consequently, the present invention should not be regarded as limited to the particular types of transmitters (e.g., radio-frequency transmitters) shown and described herein.

Still referring to FIGS. 2-4, each sensing platform 14 may be provided with a power conversion system 72. Power conversion system 72 allows each sensing platform 14 to be operated by energy derived from the transmission system 12. Power conversion system 72 thereby allows the sensing platform 14 to be operated without the need to provide a separate power source, such as a storage battery. Power conversion system 72 may comprise any of a wide range of systems suitable for deriving energy from the particular type of transmission system 12. Consequently, the present invention should not be regarded as limited to any particular type of power conversion system. However, by way of example, in one embodiment wherein the transmission system 12 comprises an electrical power transmission system 38, power conversion system 72 comprises an inductive power converter 74.

Briefly, inductive power converter 74 may comprise a wire coil 76 (FIG. 2) positioned so that it is contained within an alternating magnetic field B produced by the electrical power transmission system 38. In one embodiment, wire coil 76 may be wrapped around a portion of a two-piece or split core element 86 that is configured to surround electrical conductor 40 when the sensing platform 14 is mounted thereto, as best seen in FIGS. 2 and 3. As is known, the alternating magnetic field B surrounding the electrical conductor 40 will induce an alternating current flow in wire coil 76. Inductive power converter 74 may also be provided with suitable rectification and regulation circuitry (not shown) to convert the alternating current in wire coil 76 into a regulated, direct current suitable for use by the various components and systems comprising the sensing platform 14.

Generally speaking, it will be advantageous to design inductive power converter 74 so that it will be substantially vibration-free during operation, as vibrations produced by inductive power converter 74 would be detected by any accelerometers or motion sensors provided on the sensing platform 14. Vibration-free operation can be enhanced by ensuring that the split core element 86 remains linear (e.g., does not become magnetically saturated) during operation. Inductive power converter 74 may also be provided with one or more large capacitors or "super" capacitors (not shown) to provide electrical power to the sensing platform 14 for some period of time (e.g., minutes) if the current flow in the electrical conductor 40 is lost. Therefore, sensing platform 14 will be able to transmit information about the anomalous condition (e.g., power loss in the electrical conductor 40). Alternatively, other back-up power supplies (e.g., storage batteries) could be utilized.

Referring back now to FIG. 1, endpoint receiver 18 may comprise a receiver (not shown) suitable for receiving information 20 transmitted by one or more sensing platforms 14. Endpoint receiver 18 may also be provided with a transmitter (also not shown) for transmitting data to the various sensing platforms 14. In the embodiment shown and described herein, the receiver and transmitter are combined into a transceiver that may be identical to the transceiver utilized in the sensing platforms 14, thus will not be described in further detail herein.

As mentioned, endpoint receiver 18 may be configured to operate in conjunction with user interface system 22. Consequently, endpoint receiver 18 need not be provided with a separate user interface system, although a user interface could be provided directly on endpoint receiver 18. However, endpoint receiver 18 may be provided with a suitable data interface system (also not shown) suitable for allowing endpoint receiver 18 to communicate with user interface system 22. In an example embodiment wherein user interface system 22 comprises a general purpose programmable computer (e.g., a personal computer), the data interface system provided on the endpoint receiver 18 may comprise any of a wide range of data interface systems or communication links 77 suitable for communicating with the particular type of computer comprising the user interface system 22. Consequently, the present invention should not be regarded as limited to any particular type of data interface system. However, by way of example, in one embodiment, the data interface system may comprise an RS-232 data interface system.

In this regard, it should be noted that alternative variations are possible for allowing endpoint receiver 18 to communicate with user interface system 22 via communication link 77. For example, in an alternative embodiment, communication link 77 may comprise an existing communication system (e.g., telephone lines, microwave relay stations, fiber-optic lines, etc.) located with or nearby the transmission system 12. Thus, information may be transmitted between endpoint receiver 18 and user interface system 22 via an existing communication system. Such an arrangement may allow one or more endpoint receivers 18 to be conveniently mounted on one or more support towers 42 (FIG. 1) and tied-in to the existing communication system (e.g., telephone line), thereby allowing the user interface system 22 to be provided at any convenient location.

Still referring to FIG. 1, user interface system 22 may comprise any of a wide range of systems and devices known in the art or that may be developed in the future that are or would be suitable for allowing the desired degree of user interface with monitoring system 10. In the embodiment shown and described herein, the user interface system 22 may comprise a general purpose programmable computer system, such as a personal computer having a display system 78 and a keyboard 88. Information 20 received by endpoint receiver 18 may be displayed on the display system 78 of user interface system 22. The keyboard 88 may be utilized to manipulate the information 20 and/or change the layout of the information 20 provided on display system 78. In addition, and as will be described in greater detail below, user interface system 22 may be used to send data and/or programming information or modifications back to the sensing platforms 14 via the transceiver provided in the endpoint receiver 18.

The monitoring system 10 may be operated as follows to sense at least one condition of the transmission system 12. As was previously described, the various sensing platforms 14 may be used to sense one or more conditions of the transmission system 12, ranging from, for example, vibrations of the transmission system 12 sensed by the two-axis accelerometer 62, infrared light emitted by objects or persons within the sensing area of infrared sensor detector 64, and/or the ambient temperature, as sensed by the temperature sensor 66 (FIG. 3). The output signal(s) 36 from the sensor or sensors 26 are received by the control system or processor 28 (FIG. 4). While the control system or processor 28 may simply pass-on the signals to the transmitter 30 (FIG. 4) without evaluation or analysis (whereupon they may be transmitted as information 20), it will generally be more preferable for the control system or processor 28 to first evaluate or analyze the output signals 36 in order to determine whether the sensed conditions are normal or anomalous. In this way, only information 20 that relates to an anomalous condition need be transmitted.

Figure 5:
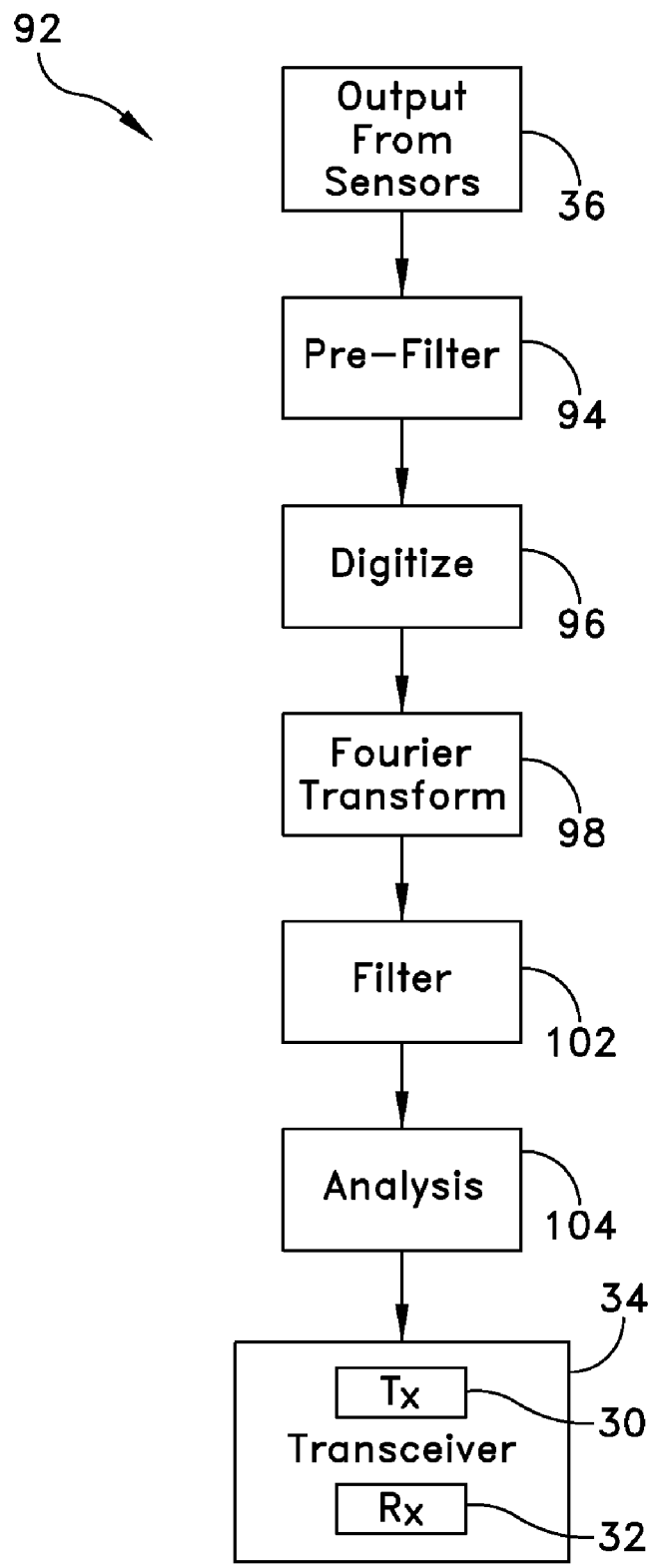
FIG. 5 is a schematic block diagram of a data processing routine utilized by a control system.

A data processing routine 92 that may be utilized by the control system 28 (FIG. 4) to evaluate the output signals 36 is illustrated in FIG. 5. In one embodiment, the output signal 36 from the sensors 26 (FIG. 4) may be pre-filtered at step 94 in order to remove unwanted or undesirable components (e.g., 60 Hz noise and harmonics thereof) from the output signals 36 in order to simplify subsequent processing and analysis. The pre-filtering process 94 may involve the use of one or more analog or digital filters, such as high-pass, low-pass, or band-pass filters. The particular characteristics of the pre-filter 94 may vary depending on the particular types of output signals 36 produced by the various sensors 26 and would be easily selected by persons having ordinary skill in the art after having become familiar with the teachings provided herein and after considering the particular sensors 26 to be utilized and noise components to be removed. Consequently, the particular types of filters that may be utilized in the pre-filtering process will not be described in further detail herein.

After suitable pre-filtering, filtered signals may then be digitized at step 96. Of course, such digitization need not be performed if the signals already comprise digital, as opposed to analog, signals. The digitized signals may then be processed by any of a wide variety of digital signal processing techniques in order to produce signals that may be more conducive to the subsequent analysis process 104. The particular digital signal processing techniques will depend on the type of analysis to be performed, e.g., to determine whether the output signals 36 are indicative of a normal condition or an anomalous condition, as well as on the particular nature of the output signals 36, e.g., whether the output signals 36 were generated by an accelerometer (e.g., a two-axis accelerometer 62), an infrared sensor (e.g., infrared detector 64), or by a temperature sensor (e.g., temperature sensor 66), see FIG. 3. For example, an output signal from a temperature sensor (e.g., temperature sensor 66) will require much less processing than an output signal generated by an accelerometer (e.g. a two-axis accelerometer 62) or an infrared sensor (e.g., infrared detector 64), in order to determine whether the signal is regarded as indicative of a normal condition or an anomalous condition. Consequently, the present invention should not be regarded as limited to any particular digital signal processing technique or series of signal processing techniques. However, by way of example, in one embodiment, a subsequent digital signal processing technique may comprise a Fast-Fourier Transform (FFT) step 98, in which the output signals are converted from the time domain into the frequency domain. A subsequent filtering step 102 may then be conducted to filter or remove unwanted components from the processed signal.

After the output signals 36 have been digitized, processed, and filtered, as described above, they may then be analyzed at step 104. As mentioned above, the analysis process 104 may be performed to determine whether the output signal 36 produced by the sensor 26 is indicative of a normal condition or an anomalous condition. One way to make such a determination is to compare the output signal 36 with a threshold value or values associated with a normal condition. If the output signal 36 is outside the threshold value or values, then the sensed condition is regarded as anomalous. The particular threshold value or values that may be utilized will depend on the particular sensor output signal to be analyzed, as well as on the particular type of transmission system 12 and environment. In certain circumstances, it will be sufficient to simply compare the processed output signal with the corresponding threshold value or values established for the particular sensor. However, in other cases, it may be necessary to additionally process the data before making the comparison.

Figure 6:
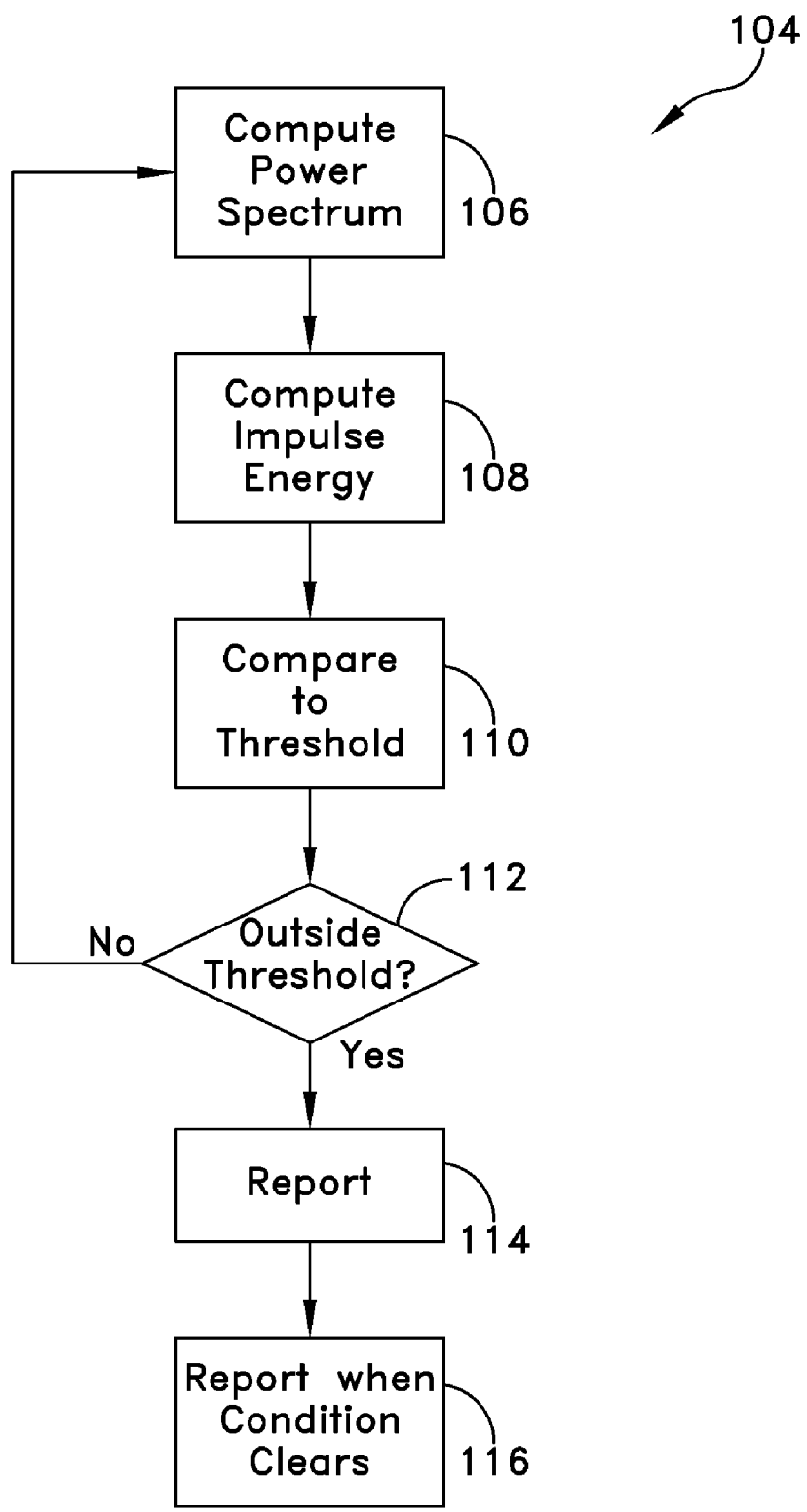
FIG. 6 is a schematic block diagram of an analysis routine.

For example, and with reference now to FIG. 6, a better determination as to whether data from a motion sensor (e.g., two-axis accelerometers 62) are indicative of a normal condition or an anomalous condition may require the power spectrum of the signal to be computed, as illustrated in step 106. The impulse energy of the power spectrum may then be computed at step 108. The computed impulse energy may then be compared with a corresponding threshold value or values at step 110.

Before proceeding with the description, it should be noted that the threshold value or values may be developed from testing associated with the particular type of transmission system 12, as well as on the particular type of sensor. For example, in the case of sensing vibrations of an electrical power transmission system 38 that may be caused by a potentially threatening event 55 (e.g., an explosion, sawing, hammering, or climbing) on one or more support towers 42, suitable threshold values may be determined by measuring accelerations detected by one or more sensing platforms 14 mounted on the electrical conductors 40 in response to simulated events. The resulting responses may then be used to establish corresponding threshold values.

While the accelerations themselves could be analyzed (e.g., as they are detected in the time domain), it will generally be easier to perform the analysis if the acceleration data is converted into the frequency domain (e.g., via Fast-Fourier Transform of process 98, FIG. 5). The power spectrum and impulse energy can be calculated (at steps 106 and 108, respectively) by known techniques. In this way, threshold values associated with potentially threatening activities can be determined and programmed into the control system 28 (FIG. 4). Then, if similar signals are detected (e.g., as determined in step 110), then a determination can be made at step 112 as to whether the signals are indicative of a normal condition (e.g., vibrations due to wind) or an anomalous condition (e.g., sawing or hammering occurring on one or more support towers 42). If an anomalous condition is determined, the control system 28 may then operate transmitter 30 to transmit information 20 relating to the anomalous condition (FIG. 4). That is, the analysis process 104 can report the anomalous condition at step 114. The analysis process 104 may also be configured to send a report (e.g., transmit information 20) when the condition clears at step 116.

As mentioned, the information 20 provided in the report (e.g., at step 114) transmitted by the sensing platform 14 may comprise any of a wide range of information. For example, in addition to merely reporting the detection of an anomalous condition, information 20 may contain processed data (e.g., the calculated impulse energy), as well as unprocessed or raw data produced by the sensors 26 (FIG. 4). The information 20 may also include data from other sensors 26 even if the data produced thereby was determined to be indicative of a normal condition. Of course, the information 20 may also contain the identity and/or location of the sensing platform 14 that detected the anomalous condition. In short, information 20 may comprise any of a wide variety of information that may be useful to a system operator if an anomalous condition is detected.

The information 20 transmitted by the sensing platform 14 that detected the anomalous condition may be relayed by one or more other sensing platforms 14 provided on the transmission system 12 before being received by endpoint receiver 18, as already described. Endpoint receiver 18 may operate in conjunction with user interface system 22 in order to provide the information 20 in any desired form. For example, upon initial receipt of information 20 relating to an anomalous condition, user interface system 22 may be programmed to provide a visual and/or aural alarm. The identification and location of the particular sensing platform or platforms 14 that detected the anomalous condition may also be provided, along with processed data and/or raw data. Any other information may be provided that would be deemed useful to a system operator in evaluating the seriousness of the situation. For example, if the sensing platform 14 is provided with an optical sensor (e.g., a camera), image data from the camera may be provided to allow a user to perhaps determine the cause of the anomalous condition.

As described earlier, the user interface system 22 and endpoint receiver 18 may also be used to transmit information to the various sensing platforms 14. For example, in response to receiving information 20 indicative of the detection of an anomalous condition, the user may instruct the user interface system 22 to send a signal to the sensing platform 14 requesting additional data relating to the detected condition. The user interface system 22 could also be used to re-program one or more of the other sensing platforms 14 to, for example, change the threshold levels. Such re-programming could allow the anomalous condition to be determined with more certainty by determining whether other sensing platforms 14 detected similar data. Of course, such re-programming of the sensing platforms 14 need not be done upon the detection of an anomalous condition, but could be done at any time. Many other variations are possible, as would become apparent to persons having ordinary skill in the art after having become familiar with the teachings provided herein. Consequently, the present invention should not be regarded as limited to the particular programming sequences and operational scenarios shown and described herein.

Having herein set forth preferred embodiments of the present invention, it is anticipated that suitable modifications can be made thereto which will nonetheless remain within the scope of the invention. The present invention shall therefore only be construed in accordance with the following appended claims.

The invention claimed is:

1. A sensing platform for monitoring a transmission system, comprising:
   a sensor configured for sensing one or more conditions selected from the group consisting essentially of:
      a condition of the transmission system; and
      a condition of an environment around the transmission system, the sensor further configured for producing an output signal related to the sensed condition;
   a control system operatively associated with the sensor and responsive to the output signal produced by the sensor, the control system configured for:
      producing output data based on the output signal produced by the sensor;
      comparing the output data with at least one threshold condition indicative of a normal condition;
      determining an anomalous condition for at least one of the transmission system and the environment around the transmission system responsive to the comparing; and
      generating information related to the anomalous condition;
   a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and
   a power conversion system operatively associated with the transmission system and configured for extracting energy from a medium intended to be conveyed by the transmission system and converting the extracted energy into a form useable by the sensing platform.

2. The sensing platform of claim 1, wherein the sensor comprises one or more sensors selected from the group consisting essentially of an accelerometer, an acoustic sensor, an optical sensor, and a temperature sensor.

3. The sensing platform of claim 1, wherein:
   the sensor comprises an accelerometer for sensing movement of the sensing platform; and
   the control system is further configured for determining the anomalous condition for the environment around the transmission system by:
      computing a power spectrum and an impulse energy for the sensed movement;
      comparing the power spectrum and the impulse energy to threshold information associated with potentially threatening activity programmed in the control system; and
      determining the anomalous condition responsive to the comparison.

4. The sensing platform of claim 1, wherein the sensor comprises an infrared detector for sensing infrared light emitted by objects or persons; and
   the control system is further configured for determining the anomalous condition for the environment around the transmission system by:
      comparing the output data to threshold information associated with potentially threatening activity from the objects or persons programmed in the control system; and
      determining the anomalous condition responsive to the comparison.

5. The sensing platform of claim 1, wherein the transceiver comprises a radio-frequency transmitter and receiver.

6. The sensing platform of claim 1, wherein the transmission system comprises an electrical power transmission system and wherein the power conversion system comprises an inductive converter for converting the medium of AC electricity.

7. A sensing platform for monitoring a transmission system, comprising:
   a sensor configured for sensing one or more conditions selected from the group consisting essentially of:
      a condition of the transmission system; and a condition of an environment around the transmission system, the sensor further configured for producing an output signal related to the one or more conditions sensed;

a control system operatively associated with the sensor and responsive to the output signal produced by the sensor, the control system configured for:
  producing output data based on the output signal produced by the sensor;
  comparing the output data with at least one threshold condition indicative of a normal condition;
  determining an anomalous condition for at least one of the transmission system and the environment around the transmission system responsive to the comparing; and
  generating information related to the anomalous condition;

a transmitter operatively associated with the control system and configured for transmitting the information related to the anomalous condition from the control system to another sensing platform; and a receiver configured for receiving transmitted signals from the other sensing platform.

8. The sensing platform of claim 7, wherein the receiver and the transmitter comprise a transceiver.

9. A system for monitoring a transmission system, comprising:

a plurality of sensing platforms operatively associated with the transmission system at a corresponding plurality of locations along the transmission system, each of the plurality of sensing platforms comprising:
  a sensor configured for sensing one or more conditions selected from the group consisting essentially of:
    a condition of the transmission system; and
    a condition of an environment around the transmission system, the sensor further configured for producing an output signal related to the one or more conditions sensed;
  a control system operatively associated with the sensor and responsive to the output signal produced by the sensor, the control system configured for:
    producing output data based on the output signal produced by the sensor;
    comparing the output data with at least one threshold condition indicative of a normal condition;
    determining an anomalous condition for at least one of the transmission system and the environment around the transmission system responsive to the comparing; and
    generating information related to the anomalous condition; and
  a transceiver operatively associated with the control system, the transceiver configured for:
    transmitting the information related to the anomalous condition from the control system to a nearby sensing platform among the plurality of sensing platforms;
    receiving information from the nearby sensing platform of the plurality; and
    retransmitting the information received from the nearby sensing platform; and at least one endpoint receiver configured for receiving the information related to the anomalous condition transmitted by at least one sensing platform of the plurality of sensing platforms.

10. The system of claim 9, further comprising a user-interface system operatively associated with the at least one endpoint receiver.

11. The system of claim 9, wherein the transceiver in each sensing platform of the plurality is further configured for transmitting, receiving, and retransmitting the output data in both directions along the transmission system.

12. A monitoring method, comprising:

sensing one or more conditions using a sensing platform positioned at a first location proximate a transmission system, the one or more conditions selected from the group consisting essentially of:
  a condition of the transmission system; and
  a condition of an environment around the transmission system;

determining an anomalous condition for at least one of the transmission system and the environment around the transmission system by:
  comparing data related to the sensed one or more conditions to at least one threshold condition indicative of a normal condition; and
  generating information related to the anomalous condition;

transmitting the information related to the anomalous condition to a nearby sensing platform positioned at a second location proximate the transmission system but at a second location along the transmission system; and retransmitting the data related to the information related to the anomalous condition from the nearby sensing platform to an additional nearby sensing platform at a third location proximate the transmission system but at a third location along the transmission system.

13. The method of claim 12, further comprising:
determining the anomalous condition for the environment around the transmission system by:
  comparing the data related to the sensed one or more conditions to threshold information associated with potentially threatening activity from objects or persons; and
  determining the anomalous condition responsive to the comparison.

14. The method of claim 12, further comprising:
receiving the transmitted data related to the information related to the anomalous condition at an intermediate transceiver positioned along the transmission system;
re-transmitting data related to the information related to the anomalous condition from the intermediate transceiver; and
receiving the re-transmitted data at an endpoint receiver.

15. The method of claim 12, wherein transmitting data related to the information related to the anomalous condition comprises transmitting radio frequency signals.

16. The method of claim 12, wherein the transmission system comprises a power transmission system having power lines and wherein transmitting comprises transmitting via the power lines.

17. A sensing platform, comprising:
sensor means for sensing one or more conditions selected from the group consisting essentially of:
  a condition of a transmission system; and
  a condition of an environment around the transmission system,
  and for producing an output signal related to the one or more sensed conditions;
means for controlling the sensing platform, operatively associated with the sensor means, for:
  operating the sensor means;

processing the output signal from the sensor means to produce output data;

comparing the output data with at least one threshold condition indicative of a normal condition;

determining an anomalous condition responsive to the comparing for at least one of the transmission system and the environment around the transmission system; and generating information related to the anomalous condition;

means for receiving monitored data from another sensing platform positioned at another location along the transmission system;

means for transmitting the information related to the anomalous condition and the monitored data from the other sensing platform; and means for extracting energy from transmission of a medium intended to be conveyed by the transmission system and converting the extracted energy into a form useable by the sensing platform.

* * * * *

UNITED STATES PATENT AND TRADEMARK OFFICE
CERTIFICATE OF CORRECTION

PATENT NO. : 7,786,894 B2  
APPLICATION NO. : 11/425287  
DATED : August 31, 2010  
INVENTOR(S) : Polk et al.

Page 1 of 1

It is certified that error appears in the above-identified patent and that said Letters Patent is hereby corrected as shown below:

On the title page:
In ITEM [56] References Cited
U.S. PATENT DOCUMENTS
2nd COLUMN, (LINE 13), change "7,292,797 B2 * 11/2007 Kunugi et al."
to --7,202,797 B2 * 4/2007 Zehavi--

In the claims:
CLAIM 5, COLUMN 14, LINE 56, change "receiver." to --a receiver.--
CLAIM 14, COLUMN 16, LINE 46, change "re-transmitting" to --retransmitting--
CLAIM 14, COLUMN 16, LINE 49, change "re-transmitted" to --retransmitted--
CLAIM 17, COLUMN 16, LINE 67, change "means:" to --means;--

Signed and Sealed this
Eighth Day of April, 2014

Michelle K. Lee
*Deputy Director of the United States Patent and Trademark Office*

(12) EX PARTE REEXAMINATION CERTIFICATE (9991st)
United States Patent
Polk et al.

(10) Number: US 7,786,894 C1
(45) Certificate Issued: Dec. 23, 2013

(54) METHODS, APPARATUS, AND SYSTEMS FOR MONITORING TRANSMISSION SYSTEMS

(75) Inventors: Robert E. Polk, Idaho Falls, ID (US); John M. Svoboda, Idaho Falls, ID (US); Phillip B. West, Idaho Falls, ID (US); Gail L. Heath, Iona, ID (US); Clark L. Scott, Idaho Falls, ID (US)

(73) Assignee: United States Department of Energy, Washington, DC (US)

Reexamination Request:
No. 90/012,655, Sep. 14, 2012

Reexamination Certificate for:
| | |
|---|---|
| Patent No.: | 7,786,894 |
| Issued: | Aug. 31, 2010 |
| Appl. No.: | 11/425,287 |
| Filed: | Jun. 20, 2006 |

(51) Int. Cl.
*G08C 19/22* (2006.01)
*H04Q 9/00* (2006.01)

(52) U.S. Cl.
USPC ............ 340/870.07; 340/870.11; 324/764.01; 374/141; 374/152; 702/183; 702/185

(58) Field of Classification Search
None
See application file for complete search history.

(56) References Cited

To view the complete listing of prior art documents cited during the proceeding for Reexamination Control Number 90/012,655, please refer to the USPTO's public Patent Application Information Retrieval (PAIR) system under the Display References tab.

*Primary Examiner* — Pia Tibbits

(57) ABSTRACT

A sensing platform for monitoring a transmission system, and method therefor, may include a sensor that senses one or more conditions relating to a condition of the transmission system and/or the condition of an environment around the transmission system. A control system operatively associated with the sensor produces output data based on an output signal produced by the sensor. A transmitter operatively associated with the control system transmits the output data from the control system.

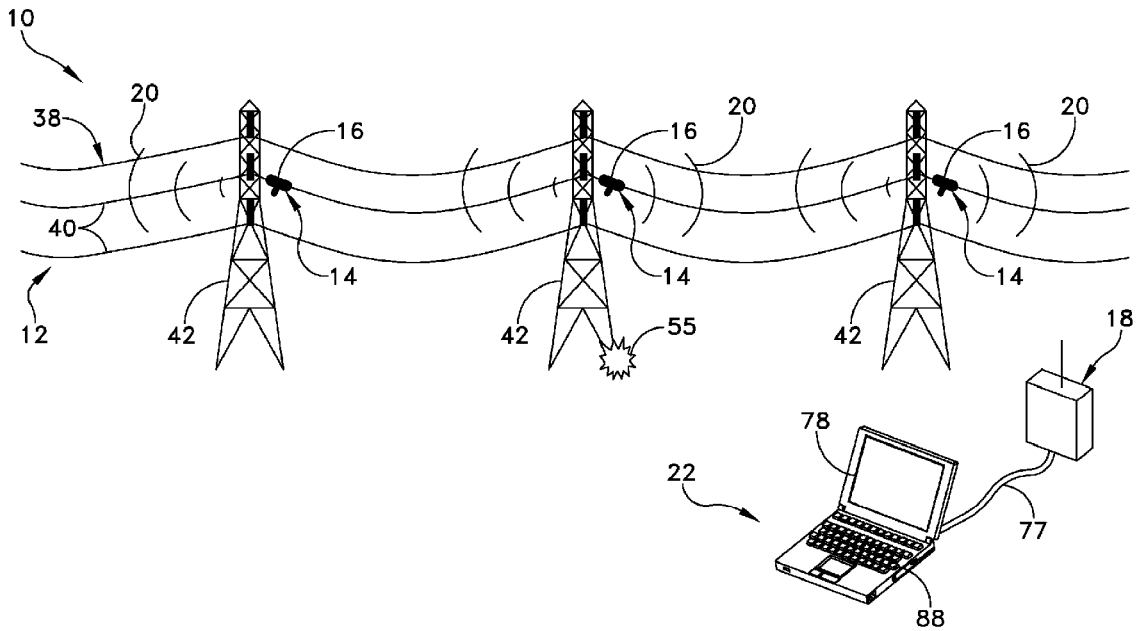

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 4, 7, 9, 12, 13 and 17 are determined to be patentable as amended.

Claims 2, 5, 6, 8, 10, 11 and 14-16, dependent on an amended claim, are determined to be patentable.

New claims 18-25 are added and determined to be patentable.

1. A sensing platform for monitoring a transmission system, comprising:
   a sensor configured for sensing one or more conditions selected from the group consisting essentially of:
   a condition of the transmission system; and
   a condition of an environment around the transmission system, the sensor further configured for producing an output signal related to the sensed condition;
   a control system operatively associated with the sensor and responsive to the output signal produced by the sensor, the control system configured for:
   producing output data based on the output signal produced by the sensor;
   *converting the output data from a time domain to a frequency domain to develop frequency domain data;*
   comparing the [output] *frequency domain* data with at least one threshold condition *defined in the frequency domain and* indicative of a normal condition;
   determining an anomalous condition for at least one of the transmission system and the environment around the transmission system responsive to the comparing; and
   generating information related to the anomalous condition;
   a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and
   a power conversion system operatively associated with the transmission system and configured for extracting energy from a medium intended to be conveyed by the transmission system and converting the extracted energy into a form useable by the sensing platform.

3. [The sensing platform of claim 1,] *A sensing platform for monitoring a transmission system, comprising:*
   *a sensor configured for sensing one or more conditions selected from the group consisting essentially of:*
   *a condition of the transmission system; and*
   *a condition of an environment around the transmission system, the sensor further configured for producing an output signal related to the sensed condition;*
   *a control system operatively associated with the sensor and responsive to the output signal produced by the sensor, the control system configured for:*
   *producing output data based on the output signal produced by the sensor;*
   *comparing the output data with at least one threshold condition indicative of a normal condition;*
   *determining an anomalous condition for at least one of the transmission system and the environment around the transmission system responsive to the comparing; and*
   *generating information related to the anomalous condition;*
   *a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and*
   *a power conversion system operatively associated with the transmission system and configured for extracting energy from a medium intended to be conveyed by the transmission system and converting the extracted energy into a form useable by the sensing platform;*
   wherein:
   the sensor comprises an accelerometer for sensing movement of the sensing platform; and
   the control system is further configured for determining the anomalous condition for the environment around the transmission system by:
   computing a power spectrum and an impulse energy for the sensed movement;
   comparing the power spectrum and the impulse energy to threshold information associated with potentially threatening activity programmed in the control system; and
   determining the anomalous condition responsive to the comparison.

4. [The sensing platform of claim 1, wherein] *A sensing platform for monitoring a transmission system, comprising:*
   *a sensor configured for sensing one or more conditions selected from the group consisting essentially of:*
   *a condition of the transmission system; and*
   *a condition of an environment around the transmission system, the sensor further configured for producing an output signal related to the sensed condition;*
   *a control system operatively associated with the sensor and responsive to the output signal produced by the sensor, the control system configured for:*
   *producing output data based on the output signal produced by the sensor;*
   *comparing the output data with at least one threshold condition indicative of a normal condition;*
   *determining an anomalous condition for at least one of the transmission system and the environment around the transmission system responsive to the comparing; and*
   *generating information related to the anomalous condition;*
   *a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and*

*a power conversion system operatively associated with the transmission system and configured for extracting energy from a medium intended to be conveyed by the transmission system and converting the extracted energy into a form useable by the sensing platform;* wherein:

the sensor comprises an infrared detector for sensing infrared light emitted by objects or persons; and the control system is further configured for determining the anomalous condition for the environment around the transmission system by:

comparing the output data to threshold information associated with potentially threatening activity from the objects or persons programmed in the control system; and determining the anomalous condition responsive to the comparison.

7. A sensing platform for monitoring a transmission system, comprising:

a sensor configured for sensing one or more conditions selected from the group consisting essentially of:

a condition of the transmission system; and a condition of an environment around the transmission system, the sensor further configured for producing an output signal related to the one or more conditions sensed;

a control system operatively associated with the sensor and responsive to the output signal produced by the sensor, the control system configured for:

producing output data based on the output signal produced by the sensor;

*converting the output data from a time domain to a frequency domain to develop frequency domain data;* comparing the [output] *frequency domain* data with at least one threshold condition *defined in the frequency domain and* indicative of a normal condition;

determining an anomalous condition for at least one of the transmission system and the environment around the transmission system responsive to the comparing; and generating information related to the anomalous condition;

a transmitter operatively associated with the control system and configured for transmitting the information related to the anomalous condition from the control system to another sensing platform; and a receiver configured for receiving transmitted signals from the other sensing platform.

9. A system for monitoring a transmission system, comprising:

a plurality of sensing platforms operatively associated with the transmission system at a corresponding plurality of locations along the transmission system, each of the plurality of sensing platforms comprising:

a sensor *comprising an accelerometer for sensing movement of the sensing platform and* configured for sensing one or more conditions selected from the group consisting essentially of:

a condition of the transmission system; and a condition of an environment around the transmission system, the sensor further configured for producing an output signal related to the one or more conditions sensed;

a control system operatively associated with the sensor and responsive to the output signal produced by the sensor, the control system configured for:

producing output data based on the output signal produced by the sensor;

[comparing the output data with at least one threshold condition indicative of a normal condition;]

*computing a power spectrum and an impulse energy from the output data for the sensed movement;*

*comparing the power spectrum and the impulse energy to threshold information associated with potentially threatening activity programmed in the control system;* determining an anomalous condition for at least one of the transmission system and the environment around the transmission system responsive to the comparing; and generating information related to the anomalous condition; and a transceiver operatively associated with the control system, the transceiver configured for:

transmitting the information related to the anomalous condition from the control system to a nearby sensing platform among the plurality of sensing platforms;

receiving information from the nearby sensing platform of the plurality; and retransmitting the information received from the nearby sensing platform; and at least one endpoint receiver configured for receiving the information related to the anomalous condition transmitted by at least one sensing platform of the plurality of sensing platforms.

12. A monitoring method, comprising:

sensing one or more conditions using a sensing platform positioned at a first location proximate a transmission system, the one or more conditions *comprising infrared light emitted by objects or persons and* selected from the group consisting essentially of:

a condition of the transmission system; and a condition of an environment around the transmission system;

determining an anomalous condition for at least one of the transmission system and the environment around the transmission system by:

comparing data related to the sensed one or more conditions to at least one threshold condition indicative of a normal condition *and associated with potentially threatening activity from the objects or persons*; and generating information related to the anomalous condition *responsive to the comparing*;

transmitting the information related to the anomalous condition to a nearby sensing platform positioned at a second location proximate the transmission system but at a second location along the transmission system; and retransmitting the data related to the information related to the anomalous condition from the nearby sensing platform to an additional nearby sensing platform at a third location proximate the transmission system but at a third location along the transmission system.

13. [The method of claim 12, further comprising:

determining the anomalous condition for the environment around the transmission system by:] *A monitoring method, comprising:*

*sensing one or more conditions using a sensing platform positioned at a first location proximate a transmission system, the one or more conditions selected from the group consisting essentially of:* a condition of the transmission system; and
a condition of an environment around the transmission system;
determining an anomalous condition for at least one of the transmission system and the environment around the transmission system by:
comparing the data related to the sensed one or more conditions to threshold information associated with potentially threatening activity from objects or persons; [and]
determining the anomalous condition responsive to the comparison; *and*
*generating information related to the anomalous condition;*
*transmitting the information related to the anomalous condition to a nearby sensing platform positioned at a second location proximate the transmission system but at a second location along the transmission system; and*
*retransmitting the data related to the information related to the anomalous condition from the nearby sensing platform to an additional nearby sensing platform at a third location proximate the transmission system but at a third location along the transmission system.*

17. A sensing platform, comprising:
sensor means for sensing one or more conditions selected from the group consisting essentially of:
a condition of a transmission system; and
a condition of an environment around the transmission system,
and for producing an output signal related to the one or more sensed conditions;
means for controlling the sensing platform, operatively associated with the sensor means, for:
operating the sensor [means:] *means;* processing the output signal from the sensor means to produce output data;
*converting the output data from a time domain to a frequency domain to develop frequency domain data;*
comparing the [output] *frequency domain* data with at least one threshold condition *defined in the frequency domain and* indicative of a normal condition;
determining an anomalous condition responsive to the comparing for at least one of the transmission system and the environment around the transmission system; and
generating information related to the anomalous condition;
means for receiving monitored data from another sensing platform positioned at another location along the transmission system;
means for transmitting the information related to the anomalous condition and the monitored data from the other sensing platform; and
means for extracting energy from transmission of a medium intended to be conveyed by the transmission system and converting the extracted energy into a form useable by the sensing platform.

18. *A sensing platform for monitoring a transmission system, comprising:*
*a sensor configured for sensing one or more conditions selected from the group consisting essentially of:*
*a condition of the transmission system; and*
*a condition of an environment around the transmission system, the sensor further configured for producing an output signal related to the sensed condition;*
*a control system operatively associated with the sensor and responsive to the output signal produced by the sensor, the control system configured for:*
*producing output data based on the output signal produced by the sensor;*
*comparing the output data with at least one externally programmed threshold condition indicative of a normal condition, wherein the one or more externally provided threshold conditions are determined from simulating events related to the transmission system;*
*determining an anomalous condition for at least one of the transmission system and the environment around the transmission system responsive to the comparing; and*
*generating information related to the anomalous condition;*
*a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and*
*a power conversion system operatively associated with the transmission system and configured for extracting energy from a medium intended to be conveyed by the transmission system and converting the extracted energy into a form useable by the sensing platform.*

19. *A sensing platform for monitoring a transmission system, comprising:*
*a sensor configured for sensing one or more conditions selected from the group consisting essentially of:*
*a condition of the transmission system; and*
*a condition of an environment around the transmission system, the sensor further configured for producing an output signal related to the sensed condition;*
*a control system operatively associated with the sensor and responsive to the output signal produced by the sensor, the control system configured for:*
*producing output data based on the output signal produced by the sensor;*
*converting the output data from a time domain to a frequency domain to develop frequency domain data;*
*comparing the frequency domain data with the one or more externally provided threshold conditions defined in the frequency domain;*
*determining an anomalous condition for at least one of the transmission system and the environment around the transmission system responsive to the comparing; and*
*generating information related to the anomalous condition;*
*a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and*
*a power conversion system operatively associated with the transmission system and configured for extracting energy from a medium intended to be conveyed by the transmission system and converting the extracted energy into a form useable by the sensing platform.*

20. *A sensing platform for monitoring a transmission system, comprising:* a sensor configured for sensing one or more conditions selected from the group consisting essentially of:
  a condition of the transmission system; and
  a condition of an environment around the transmission system, the sensor further configured for producing an output signal related to the sensed condition;
a control system operatively associated with the sensor and responsive to the output signal produced by the sensor, the control system configured for:
  producing output data based on the output signal produced by the sensor;
  comparing the output data to threshold information associated with potentially threatening activity from the objects or persons programmed in the control system;
  determining the anomalous condition responsive to the comparison; and
  generating information related to the anomalous condition;
a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and
a power conversion system operatively associated with the transmission system and configured for extracting energy from a medium intended to be conveyed by the transmission system and converting the extracted energy into a form useable by the sensing platform.

21. A sensing platform for monitoring a transmission system, comprising:
a sensor comprising an accelerometer for sensing movement of the sensing platform and configured for sensing one or more conditions selected from the group consisting essentially of:
  a condition of the transmission system; and
  a condition of an environment around the transmission system, the sensor further configured for producing an output signal related to the sensed condition;
a control system operatively associated with the sensor and responsive to the output signal produced by the sensor, the control system configured for performing analysis processes including:
  computing a power spectrum and an impulse energy for the sensed movement;
  comparing the power spectrum and the impulse energy to threshold information associated with potentially threatening activity programmed in the control system;
  determining the anomalous condition responsive to the comparison; and
  generating information related to the anomalous condition;
a transceiver operatively associated with the control system and configured for receiving transmitted data from a second sensing platform, retransmitting the transmitted data to a third sensing platform, and transmitting the information related to the anomalous condition from the control system to at least one of the second sensing platform and the third sensing platform; and
a power conversion system operatively associated with the transmission system and configured for extracting energy from a medium intended to be conveyed by the transmission system and converting the extracted energy into a form useable by the sensing platform.

22. A sensing platform for monitoring a transmission system, comprising:
a sensor comprising an infrared detector for sensing infrared light emitted by objects or persons and configured for sensing one or more conditions selected from the group consisting essentially of:
  a condition of the transmission system; and
  a condition of an environment around the transmission system, the sensor further configured for producing an output signal related to the sensed condition;
a control system operatively associated with the sensor and responsive to the output signal produced by the sensor, the control system configured for performing analysis processes including:
  producing output data in a digital format based on the output signal produced by the sensor and performing digital processing to produce the output data in a form more conducive to subsequent analysis processes;
  comparing the output data to threshold information associated with potentially threatening activity from the objects or persons programmed in the control system;
  determining the anomalous condition responsive to the comparison; and
  generating information related to the anomalous condition;
a transceiver operatively associated with the control system and configured for receiving transmitted data from a second sensing platform, retransmitting the transmitted data to a third sensing platform and transmitting the information related to the anomalous condition from the control system to at least one of the second sensing platform and the third sensing platform; and
a power conversion system operatively associated with the transmission system and configured for extracting energy from a medium intended to be conveyed by the transmission system and converting the extracted energy into a form useable by the sensing platform.

23. A monitoring method, comprising:
sensing one or more conditions using a sensing platform positioned at a first location proximate a transmission system, the one or more conditions selected from the group consisting essentially of:
  a condition of the transmission system; and
  a condition of an environment around the transmission system;
determining an anomalous condition for at least one of the transmission system and the environment around the transmission system by performing analysis processes including:
  producing output data in a digital format responsive to the sensed one or more conditions;
  performing digital processing to produce the output data in a form more conducive to a subsequent analysis processes;
  comparing the data related to the sensed one or more conditions to threshold information associated with potentially threatening activity from objects or persons; and
  generating information related to the anomalous condition responsive to the comparing;
transmitting the information related to the anomalous condition to a nearby sensing platform positioned at a second location proximate the transmission system but at a second location along the transmission system; and retransmitting the data related to the information related to the anomalous condition from the nearby sensing platform to an additional nearby sensing platform at a third location proximate the transmission system but at a third location along the transmission system.

24. A monitoring method, comprising:

sensing one or more conditions using a sensing platform positioned at a first location proximate a transmission system, the one or more conditions selected from the group consisting essentially of:
    a condition of the transmission system; and
    a condition of an environment around the transmission system;

determining an anomalous condition for at least one of the transmission system and the environment around the transmission system by performing analysis processes including:
    producing output data in a digital format responsive to the sensed one or more conditions;
    performing digital processing to produce the output data in a form more conducive to a subsequent analysis processes;
    comparing processed output data to at least one threshold condition indicative of a normal condition; and
    generating information related to the anomalous condition responsive to the comparing;

transmitting the information related to the anomalous condition to a nearby sensing platform positioned at a second location proximate the transmission system but at a second location along the transmission system;

retransmitting the data related to the information related to the anomalous condition from the nearby sensing platform to an additional nearby sensing platform at a third location proximate the transmission system but at a third location along the transmission system; and converting the data related to the sensed one or more conditions from a time domain to a frequency domain to develop frequency domain data and wherein comparing data related to the sensed one or more conditions to at least one threshold condition indicative of a normal condition comprises comparing the frequency domain data to the at least one threshold condition defined in the frequency domain.

25. The method of claim 34, further comprising:

computing a power spectrum and an impulse energy from the data in the frequency domain;

comparing the power spectrum and the impulse energy to the at least one threshold condition; and determining the anomalous condition responsive to the comparison.

* * * * *